US008464009B2

(12) United States Patent
Sivaramakrishnan et al.

(10) Patent No.: US 8,464,009 B2
(45) Date of Patent: Jun. 11, 2013

(54) METHOD FOR MEMORY INTERLEAVE SUPPORT WITH A CEILING MASK

(75) Inventors: Ramaswamy Sivaramakrishnan, San Jose, CA (US); Connie Cheung, Sunnyvale, CA (US); William Bryg, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 544 days.

(21) Appl. No.: 12/133,070

(22) Filed: Jun. 4, 2008

(65) Prior Publication Data

US 2009/0307434 A1 Dec. 10, 2009

(51) Int. Cl.
*G06F 12/06* (2006.01)
*G06F 15/16* (2006.01)

(52) U.S. Cl.
USPC ............. 711/157; 711/147; 711/E12.023; 711/E12.066; 711/E12.079

(58) Field of Classification Search
None
See application file for complete search history.

(56) References Cited

U.S. PATENT DOCUMENTS

| | | | | |
|---|---|---|---|---|
| 5,293,607 A * | 3/1994 | Brockmann et al. | ............ | 711/5 |
| 5,561,784 A * | 10/1996 | Chen et al. | .................. | 711/157 |
| 5,758,183 A * | 5/1998 | Scales | ......................... | 711/148 |
| 6,041,393 A * | 3/2000 | Hsu | ................................ | 711/5 |
| 6,070,227 A * | 5/2000 | Rokicki | ...................... | 711/117 |
| 6,363,458 B1 * | 3/2002 | Park | ........................... | 711/141 |
| 6,483,516 B1 * | 11/2002 | Tischler | ...................... | 711/122 |
| 7,443,759 B1 * | 10/2008 | Rowlands et al. | ............ | 365/227 |
| 2008/0320255 A1 * | 12/2008 | Wingard et al. | ............. | 711/157 |
| 2010/0138587 A1 * | 6/2010 | Hutson | ............................ | 711/5 |

OTHER PUBLICATIONS

U.S. Appl. No. 60/946,096, filed Jun. 25, 2007.*

* cited by examiner

*Primary Examiner* — Reginald Bragdon
*Assistant Examiner* — Daniel Bernard
(74) *Attorney, Agent, or Firm* — Polsinelli PC

(57) ABSTRACT

A distributed shared memory multiprocessor system that supports both fine- and coarse- grained interleaving of the shared memory address space. A ceiling mask sets a boundary between the fine-grain interleaved and coarse-grain interleaved memory regions of the distributed shared memory. A method for satisfying a memory access request in a distributed shared memory subsystem of a multiprocessor system having both fine- and coarse-grain interleaved memory segments. Certain low or high order address bits, depending on whether the memory segment is fine- or coarse-grain interleaved, respectively, are used to determine if the memory address is local to a processor node. A method for setting the ceiling mask of a distributed shared memory multiprocessor system to optimize performance of a first application run on a single node and performance of a second application run on a plurality of nodes.

14 Claims, 5 Drawing Sheets

METHOD FOR MEMORY INTERLEAVE SUPPORT WITH A CEILING MASK

FIELD OF THE INVENTION

Aspects of the present invention relate to distributed shared memory multiprocessor systems and more particularly to memory interleave support with a ceiling mask to allow both fine-grained and coarse-grained interleaving across the distributed shared memory.

BACKGROUND

In a multiprocessor system with distributed shared memory, each processor node may have a fraction of the total distributed shared memory that is local to that processor node. Because the address space of the distributed shared memory is shared, the same physical address on any processor node refers to the same location in the distributed shared memory. Distributing the memory may provide a cost-effective way to scale the memory bandwidth when most accesses are to local memory of a node and may reduce latency for accesses to the local memory. By separating local memory traffic from remote memory traffic, bandwidth demands on the distributed shared memory system and interconnect network may be reduced.

Latency generally refers to the elapsed time between issuing a request to the memory system and receiving a response or reply. Latency may be measured in units of time (seconds, microseconds, etc.) or in cycles. Memory bandwidth generally refers to the throughput of the memory system (i.e., the rate at which the memory system can satisfy requests). Memory bandwidth may be expressed as the number of requests per unit time. When each request corresponds to a fixed number of bytes of data, for example, bandwidth may be expressed as the number of bytes per unit time.

In existing shared memory multiprocessors, communication of data between processor nodes may cost anywhere from 50 clock cycles for multicore processor chips to over 1000 clock cycles for large-scale multiprocessors depending on the communication mechanism, type of interconnect network and scale of the multiprocessor. Thus, accesses to memory that is local to a node is generally faster than accesses to memory that is remote (i.e., accesses to memory that is local to another node). Remote accesses typically incur a penalty to go across the interconnect network and return, resulting in increased latency.

Local memory for a node may be provided by interleaving the distributed shared memory among the nodes. Typically, certain fixed bits of the physical memory address may be used to identify the local node for a portion of the distributed shared memory. For example, in a four node distributed shared memory multiprocessor system, physical address bits 30 and 31 may be used to identify the node for a memory address when the shared memory space is interleaved on one gigabyte address boundaries.

However, such a coarse-grained interleave may lead to memory hotspots when shared code and/or data structures residing on a particular node are frequently accessed by other nodes (i.e., a node's local memory is frequently accessed by remote nodes). Hence there is a need in the art for techniques to interleave distributed shared memory of a multiprocessor system that reduce memory hotspots when code and/or data structures are shared across the nodes.

SUMMARY

One aspect of the present invention involves a method for accessing a distributed shared memory in a multiprocessor system. The method involves allocating a first shared memory space with a fine-grain interleave block size and a second shared memory space with a coarse-grain interleave block size in a distributed shared memory. The method further involves receiving a memory access request that includes a physical memory address, determining whether the memory address points to the first shared memory space and accessing the first shared memory space when the memory address points to the first shared memory space.

Another aspect of the present invention involves a method for programming a ceiling mask register in a distributed shared memory multiprocessor system. The method involves obtaining a first memory requirement for a first application to be run on a single node of a plurality of nodes of the multiprocessor system and setting a coarse-grain interleave block size based, at least in part, on the first memory requirement. The method further involves allocating a first portion of a distributed shared memory as a fine-grain interleaved shared memory space with a first block size equal to a fine-grain interleave block size and a second portion of the distributed shared memory as a coarse-grain interleaved shared memory space with a block size equal to the coarse-grain interleave block size. Finally, the method involves establishing a ceiling mask register at a value equal to the coarse-grain interleave block size times a quantity of the plurality of nodes.

Yet another aspect of the present invention involves a distributed shared memory multiprocessor system. The distributed shared memory multiprocessor system includes a plurality of nodes. Each node includes a processor, a memory configured as a local memory of the node, and a ceiling mask register. The memory includes a unique physical address range of physical memory addresses of a distributed shared memory system. The distributed shared memory system includes a first memory space distributed across the plurality of nodes with a fine-grain interleave block size and a second memory space distributed across the plurality of nodes with a coarse-grain interleave block size. The ceiling mask indicates a boundary separating the first memory space and the second memory space.

DETAILED DESCRIPTION

Figure 1:
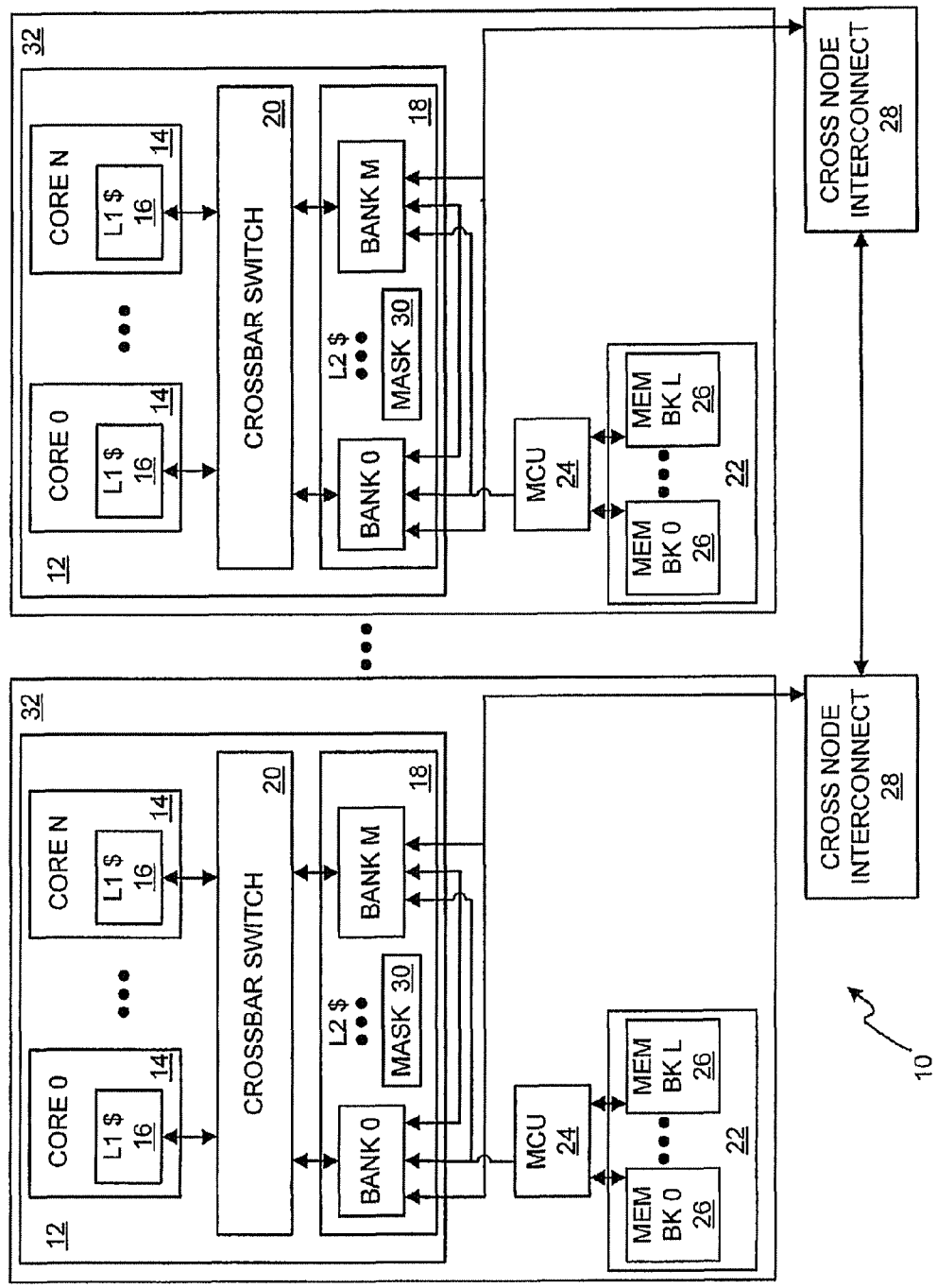
FIG. 1 depicts a block diagram of one embodiment of a distributed shared memory multiprocessor system that supports both fine and coarse-grained interleaving of the shared memory address space

FIG. 1 depicts a block diagram of one embodiment of a distributed shared memory multiprocessor system 10 that may support both fine- and coarse-grained interleaving of the shared memory address space. Fine-grained memory space may be allocated to shared applications and/or shared data structures to reduce memory hotspots. A shared application or shared data structure generally refers to an application or data structure that may be run on or accessed by a plurality of nodes of the multiprocessor system. A memory hotspot may be caused by multiple nodes accessing a memory space local to one node resulting in a memory bottleneck due to the limited memory bandwidth available at that node. By striping the shared application across all the nodes, memory accesses may also be distributed across the nodes, reducing memory hotspots and bandwidth requirements.

A shared application may also be allocated to a fine-grained memory space to distribute remote access latency across the nodes. If a shared application were to be allocated to the local memory of one node, that node would have very low latency at the expense of all the other nodes incurring remote access latencies. By striping the shared application across the nodes, the average latency at each node may be increased but no node is penalized with the maximum latency resulting from memory accesses that are always remote. Further, the cache hierarchy may reduce the frequency of remote accesses by caching the shared data. Caching of shared data may reduce the average latency by incurring a remote access latency penalty when a cache miss occurs, requiring a remote memory access.

As depicted in FIG. 1, the distributed shared memory multiprocessor system 10 may have a plurality of processor nodes 32. Each processor node may include a multicore processor chip 12 with a plurality of processor cores 14. Each processor core 14 may have a L1 cache 16. The processor cores may share a L2 cache 18 that may be banked to provide increased cache bandwidth. A crossbar switch 20 may interconnect the L1 caches with the shared L2 cache. Each node may include physical memory 22 that is local to that node. A memory control unit 24 may be used to coordinate memory accesses to the physical memory 22 comprising a plurality of physical memory banks 26. While a single memory control unit 24 is depicted, other embodiments may employ a plurality of memory control units to provide increased local memory bandwidth. A cross-node interconnect 28 may be utilized to coordinate remote memory accesses and also handle coherency traffic to maintain memory consistency across the nodes.

A boundary between fine-grain and coarse-grain interleaved memory regions of the distributed shared memory system may be set using a programmable ceiling mask register 30. In one embodiment, the bits of the register may correspond to the higher order memory address bits delineating the boundary between the fine- and coarse-grain interleaved memory space. For example, a mask register having eight bits (bit 0 to bit 7) may correspond to memory address bits 32 to 39. This may provide a coarse-grain interleave boundary that is programmable on 4 gigabyte boundaries. Setting the register to zero may indicate that shared memory space addresses zero through 4 GB-1 are fine-grain interleaved while addresses greater than or equal to 4 GB are coarse-grain interleaved, setting the register to a value of one may indicate that shared memory space addresses zero through 8 GB-1 are fine-grain interleaved while addresses greater than or equal to 8 GB are coarse-grain interleaved and so on. That is, shared memory space addresses less than the ceiling mask register may be treated as being resident in a fine-grain interleaved shared memory space whereas memory addresses greater than or equal to the ceiling mask register 30 may be treated as being resident in a coarse-grain interleaved shared memory space. In certain embodiments, the ceiling mask register may include an additional bit, e.g., bit 8, that may be set to indicate that the entire memory space is fine-grain interleaved.

The block size of the coarse-grain interleave space (may also be referred to herein as the coarse-grain interleave block size) and the number of nodes determine which bits of the memory address may be used as node select bits to locate the node. For example, in a four node system with a coarse-grain interleave block size of one megabyte, address bits 30 and 31 may be used to select the node. Alternatively, for a two node system, address bit 30 may be used to select the node.

The ceiling mask register 30 may be programmed when the multiprocessor system is booted to set the fine-grain to coarse-grain interleave boundary.

In another embodiment, a ceiling mask register may have the same number of bits as memory address bits. In this embodiment, the ceiling mask register bits 0 through 31 may be set (i.e., to a one) and the higher ceiling mask register bits not set (i.e., to a zero) to specify a fine-grain to coarse-grain interleave boundary of four gigabytes.

Figure 2:
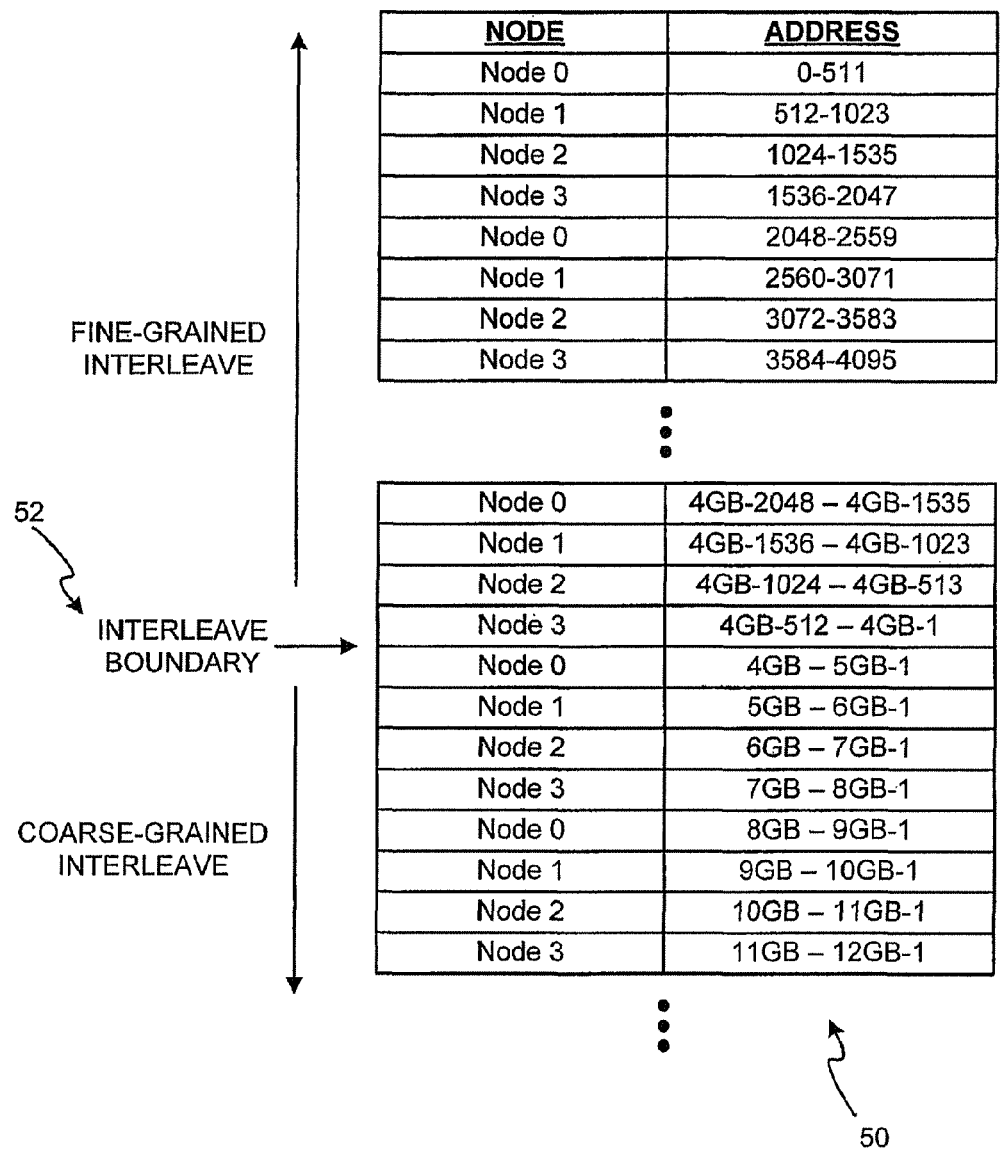
FIG. 2 depicts how a distributed shared memory address space may be distributed across a four node system by one embodiment.

FIG. 2 depicts how a distributed shared memory address space 50 may be distributed across a four node system by one embodiment employing a coarse-grain interleave block size of one gigabyte, a fine-grain interleave block size of 512 bytes and a fine-grain to coarse-grain interleave boundary 52 set at four gigabytes. Below four gigabytes, the shared memory address space may be fine-grain interleaved resulting in the memory addresses being striped across the nodes, e.g., on 512 byte boundaries (i.e., a 512 byte block size, which may be referred to herein as the fine-grain interleave block size). Certain low order physical memory address bits may be used to identify the node when the fine-grain interleaved memory space is accessed. For example, in a four node system, address bits nine and ten may be used to identify the node when a fine-grain interleave block size of 512 bytes is used. In the example illustrated by FIG. 2, memory addresses from 0-511, 2048-2559, and so on are mapped to node 0 local memory space; memory addresses from 512-1023, 2560-3071, and so on are mapped to node 1 local memory space; memory addresses from 1024-1535, 3072-3583, and so on are mapped to node 2 local memory space; and memory addresses from 1536-2047, 3584-4095, and so on are mapped to node 3 local memory space.

Alternatively, for a two node system, address bit nine may be used to identify the node when a fine-grain interleave block size of 512 bytes is used.

As depicted in FIG. 2, memory addresses of four gigabytes and above may be coarse-grain interleaved with a one gigabyte coarse grain interleave block size. Certain higher order physical memory address bits may be used to identify the node when the coarse-grain interleaved shared memory space is accessed. For example, in a four node system with a one gigabyte coarse-grain interleave block size, address bits 30 and 31 may be used to identify the node. In the example of FIG. 2, memory addresses from 4 GB-5 GB-1, 8 GB-9 GB-1, and so on are mapped to node 0 local memory space; memory addresses from 5 GB-6 GB-1, 9 GB-10 GB-1, and so on are mapped to node 1 local memory space; memory addresses from 6 GB-7 GB-1, 10 GB-11 GB-1, and so on are mapped to node 2 local memory space; and memory addresses from 7 GB-8 GB-1, 11 GB-12 GB-1, and so on are mapped to node 3 local memory space.

Alternatively, in a two node system with a one gigabyte coarse-grain interleave block size, address bit 30 may be used to identify the node.

It is to be appreciated that the ceiling mask register may be set to other values to obtain larger or smaller sized coarse-grain interleaved memory segments. Typically the ceiling mask register may be chosen based on the memory requirements of a shared application and/or the memory requirements of an application to be run on a single node. For example, a database application may require eight gigabytes of memory. If the database application will run on all the nodes of a four node system, the ceiling mask may be set to indicate a boundary of eight gigabytes so that sufficient fine-grain interleaved shared memory space may be allocated for the database application.

The L2 cache may be banked to achieve a larger capacity while keeping the access latency low. The term "banked" indicates that the cache memory address space is partitioned (interleaved) into multiple banks (e.g., bank 0 caches block addresses from partition 0, bank 1 caches block addresses from partition 1, and so on). For example, in an L2 cache with eight banks (bank 0-bank 7) and a cache line (or cache block) size of 64 bytes, the cache may be partitioned to spread the addresses of the cache blocks sequentially across the banks (also referred to as sequential interleaving) so that bank 0 has all blocks whose address modulo 8 is 0, bank 1 has all blocks whose address modulo 8 is 1, bank 2 has all blocks whose address modulo 8 is 2, and so on. Bank selection bits may be used to identify the bank and the remaining address bits may be used for indexing the selected bank to locate the cache block. For example, a one megabyte, sequentially interleaved L2 cache with 8 banks and a cache block size of 64 bytes may use address bits 6-8 as bank selection bits and address bits 9-19 as index bits.

It should be noted that in one embodiment, each same-interleaved memory space may be a multiple of the coarse-grained interleave block size times the number of nodes in the system. For example, in the present example with four nodes, the ceiling mask boundary may be a multiple of four gigabytes for a coarse-grained interleave block size of one gigabyte. The fine-grain interleaved memory space may be of size four gigabytes. Setting the fine-grain to coarse-grain interleave boundary to the number of nodes times the coarse-grain interleave block size allows the coarse-grain interleave blocks to start at the boundary address.

It is to be appreciated that the fine-grain interleave block size may be chosen as the L2 cache line size times the number of banks in the L2 cache. For example, a fine-grain interleave block size of 512 bytes may be used for an L2 cache having a line size of 64 bytes and eight banks. Other embodiments may use a fine-grain interleave block size equal to a multiple of the cache line size, e.g., 64 bytes, 128 bytes, etc.

When an application is scheduled to be run, the operating system may allocate fine-grain interleaved memory space to the application when it will run on more than one node (e.g., a database application that will run on multiple nodes) to reduce memory hotspots. Alternatively, when an application is scheduled to be run on a single node (or by threads executing on a single node), the application may be allocated coarse-grain interleaved memory space so that all memory accesses are local accesses to reduce memory latency.

Figure 3:
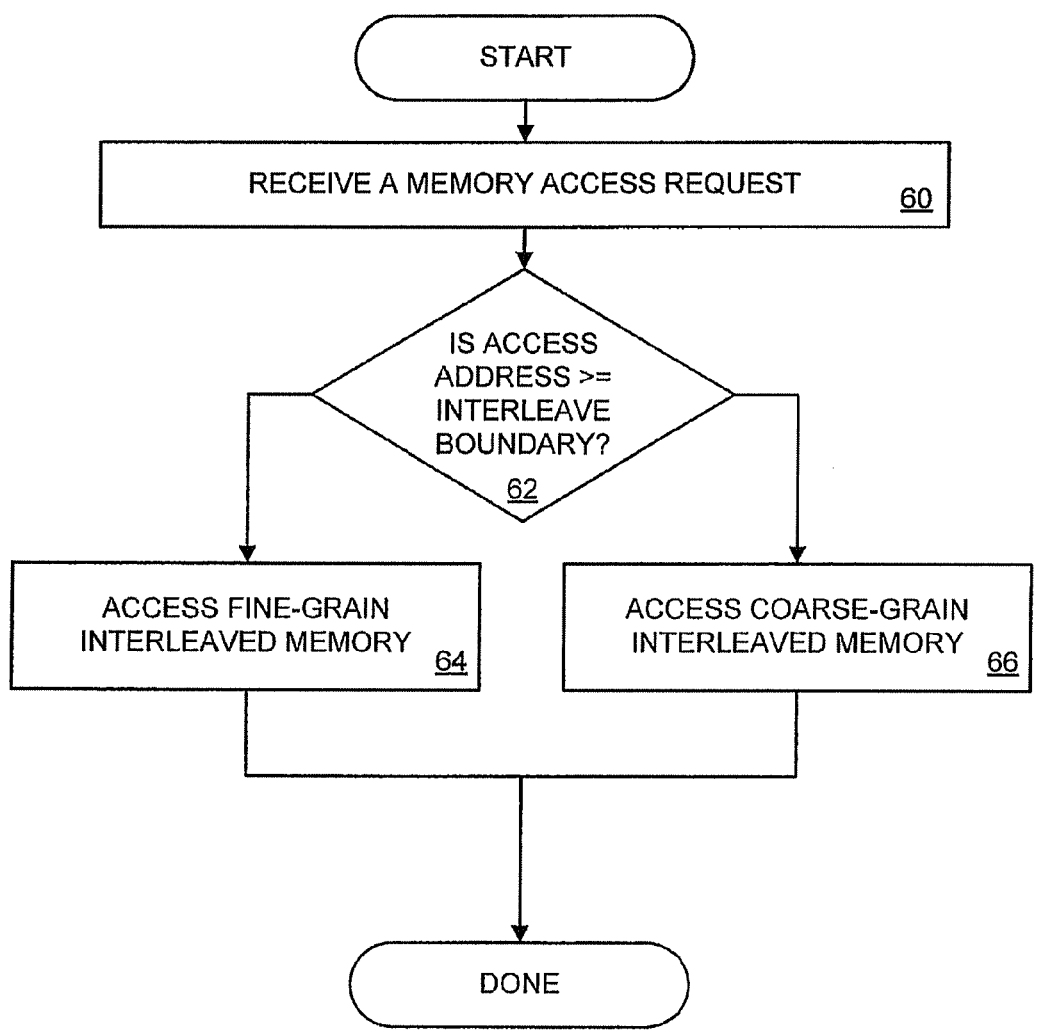
FIG. 3 depicts a flowchart illustrating one method for satisfying a memory request in a distributed shared memory subsystem having both fine and coarse-grained memory interleave segments.

In a distributed shared memory subsystem that may include both fine-grain and coarse-grain interleaved memory segments, different physical address bits may be used to determine whether or not a memory address is local to a node. FIG. 3 depicts a flowchart illustrating one method for satisfying a memory access request in a distributed shared memory subsystem having both fine and coarse-grain interleaved memory segments. Initially, operation 60 receives a memory access request (e.g., to obtain information or to store information) directed to the distributed shared memory system. Next, operation 62 compares the memory access request address against a boundary to determine if the address of the memory access request is located in a fine-grain or coarse-grain interleaved memory segment. If operation 62 determines that the access address is less than the fine-grain to coarse-grain interleave boundary, then operation 64 is performed to access the fine-grain interleaved memory space of the distributed shared memory system. If operation 62 determines that the access address is greater than or equal to the fine-grain to coarse-grain interleave boundary, then operation 66 is performed to access the coarse-grain interleaved shared memory space the distributed shared memory system.

In one embodiment, the memory request may be compared with the ceiling mask at the cache hierarchy level where memory system coherence is enforced. For example, L1 write-through caches may be employed to simplify the L1 cache design by propagating all writes to the L2 cache (which maintains the latest copy of a data block and where memory coherence is maintained). The L2 cache may be a writeback cache. A L2 writeback cache may reduce communication bandwidth requirements between nodes by only initiating writes when a dirty data block is evicted from the L2 cache and only forwarding requests to remote nodes that are not local to the node or resident in the L2 cache. It is to be appreciated that an address comparison is not performed at the L1 cache level because any L1 cache misses or writes are propagated to the shared L2 cache for further processing.

When a memory access request is received from the L1 cache, the L2 cache may immediately return the requested cache line when a L2 cache hit occurs (i.e., the requested cache line is resident in the L2 cache). Otherwise, the L2 cache may compare the requested cache line address with the ceiling mask register to determine whether the address is resident in a fine-grain or a coarse-grain interleaved shared memory segment of the distributed shared memory system.

Figure 4:
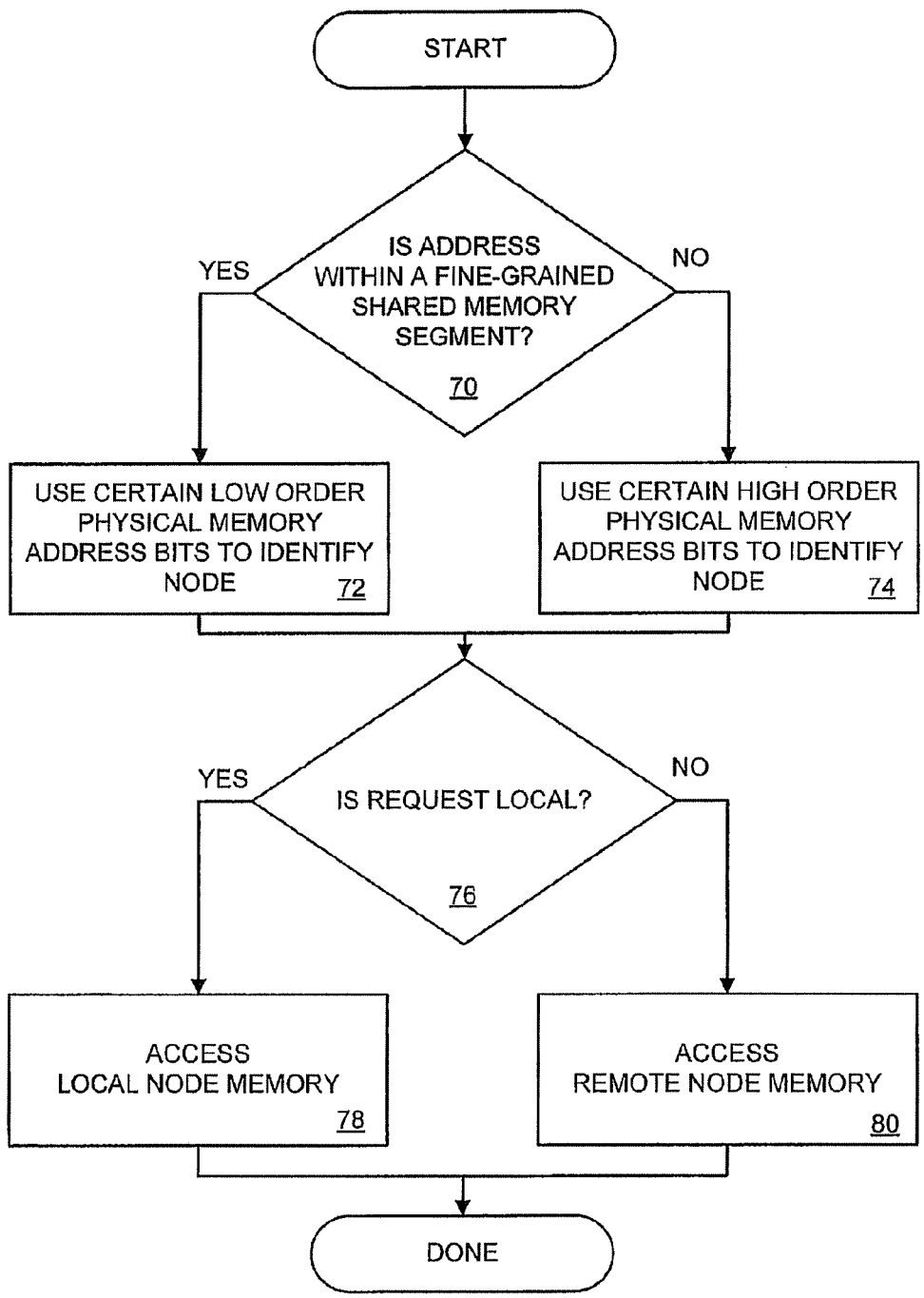
FIG. 4 depicts a flowchart illustrating one method for retrieving information from a distributed shared memory space.

FIG. 4 depicts a flowchart illustrating one method for accessing a distributed shared memory system with both coarse- and fine-grain interleaved memory. Initially, operation 70 determines if the access request is directed to a coarse-grain interleaved memory segment. If the access request is to a coarse-grain interleaved memory segment, operation 72 may use certain high order physical memory address bits to identify the node having the coarse-grain interleaved memory block including the access request address (i.e., the memory agent node). In a distributed shared memory system, a node may be referred to as the memory agent node for all memory addresses that are local to that node. In the example of FIG. 2, memory access address bits 30 and 31 may be used as a "Node ID" to identify the memory agent node. Address bits <30, 31> equal to <0, 0> indicates memory agent node 0, <0,1> indicates memory agent node 1, <1, 0> indicates memory agent node 2 and <1, 1> indicates memory agent node 3.

If operation 70 determines that the access request is directed to a fine-grain interleaved memory segment, operation 72 may use certain low order physical memory address bits to identify the node having the fine-grain interleaved memory block including the access request address (i.e., the memory agent node). In the example of FIG. 2, memory access address bits 9 and 10 may be used as the Node ID to identify the memory agent node. For example, address bits <9, 10>=<0, 0> indicates memory agent node 0, <0, 1> indicates memory agent node 1, <1, 0> indicates memory agent node 2 and <1, 1> indicates memory agent node 3.

After either operation 72 or 74, operation 76 determines if the access request is to memory local to the node. In one embodiment, a local request may be indicated by the Node ID of the access address matching the Node ID of the node making the access request, e.g., a Node ID=<0, 0> for an access request generated by node 0. If operation 76 determines that the access request is to memory local to the node, operation 78 performs a local memory access.

If operation 76 determines that the access request is not local (i.e., the Node ID is not equal to the Node ID of the node making the access request), operation 80 performs a remote memory access to the appropriate remote node's memory. This may be done by issuing an access request via a cross node interconnect.

In certain embodiments, the ceiling mask register may be set based on the applications to be run on the distributed shared memory multiprocessor system to optimize performance. For example, one application may be run on a single node. Coarse-grain interleaved shared memory space may be allocated for that application. Allocating coarse-grain interleaved memory space local to the node for the application allows all memory accesses to be local, resulting in reduced memory latency and increased performance. Alternatively, another application may be executed on all nodes. Fine-grain interleaved memory space may be allocated to the application to reduce memory hotspots and bandwidth bottlenecks at each node, thereby increasing performance.

Figure 5:
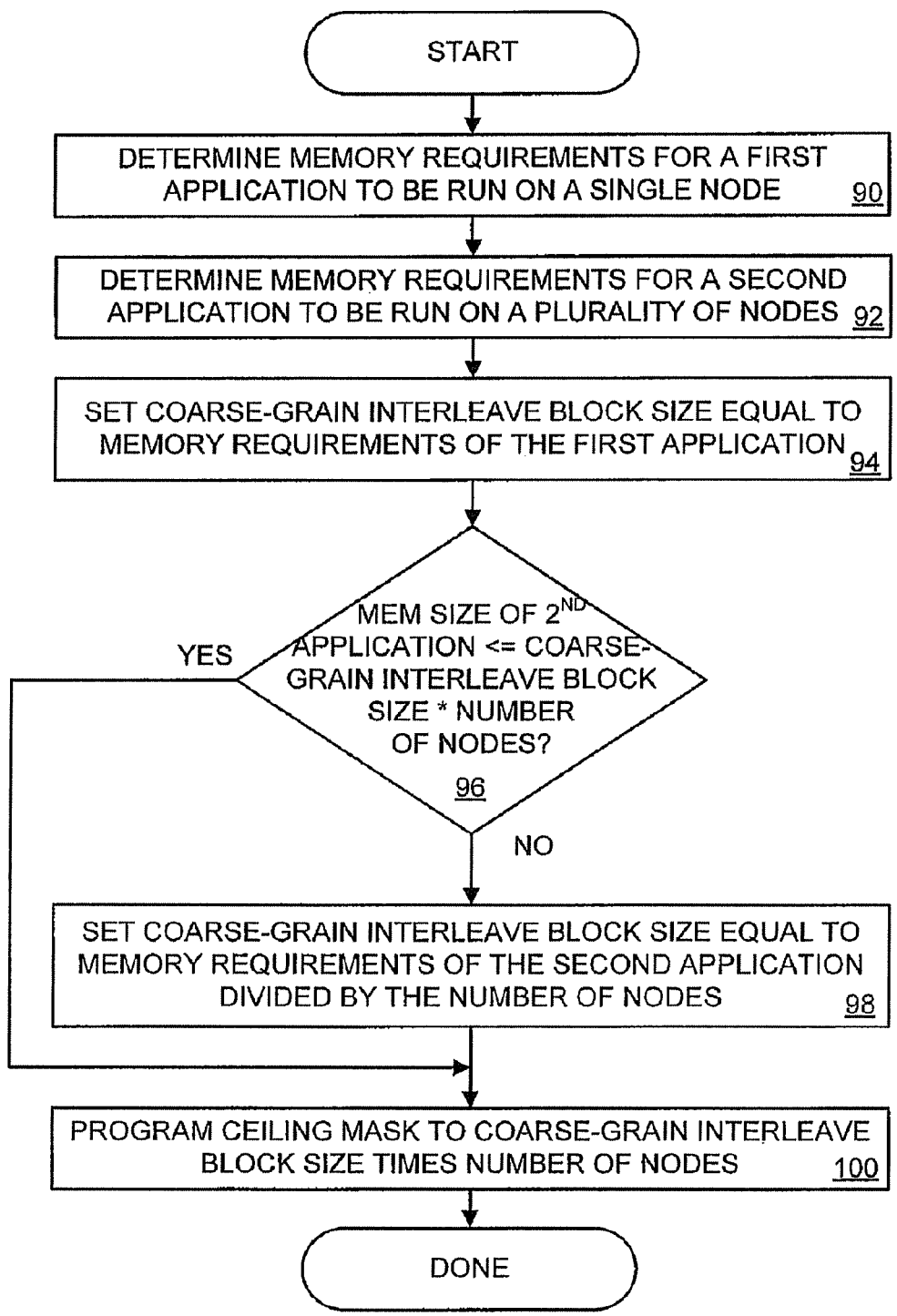
FIG. 5 depicts a flowchart illustrating one method of determining the value of the ceiling mask to optimize performance of a first application to be run on a single node and a second application to be run on a plurality of nodes of a distributed shared memory multiprocessor system.

FIG. 5 depicts a flowchart illustrating one method of determining the value of the ceiling mask register to optimize performance of a first application to be run on a single node and a second application to be run on a plurality of nodes of a distributed shared memory multiprocessor system. Initially, operation 90 determines the memory requirements of a first application to be run locally on one node. Because the first application will be run on one node, the first application may be allocated coarse-grain interleaved shared memory space.

Next, operation 92 determines the memory requirements of a second application to be run on a plurality of nodes. That is, the second application may be allocated fine-grain interleaved shared memory space.

Then, operation 94 sets the coarse-grain interleave block size equal to the memory size of the first application rounded up to the nearest power of two. In one embodiment, the coarse-grain interleave block size may be rounded up to the nearest one gigabyte.

Following operation 94, operation 96 determines if the memory requirements of the second application is less than or equal to the coarse-grain interleave block size times the number of processor nodes. If the memory requirements of the second application are less than or equal to the coarse-grain interleave block size times the number of processor nodes, operation 100 is performed.

If operation 96 determines that the memory requirements of the second application are greater than the coarse-grain interleave block size times the number of processor nodes, operation 98 is performed. Operation 98 sets the coarse-grain interleave block size equal to the memory size requirement of the second application divided by the number of nodes rounded up to the nearest power of two. In one embodiment, the coarse-grain interleave block size may be rounded up to the nearest one gigabyte.

Finally, operation 100 programs the ceiling mask register to a value that sets the fine-grain to coarse-grain memory interleave boundary to the coarse-grain interleave block size times the number of nodes.

That is, the coarse-grain interleave block size is set to a value that is sufficient to allocate enough local coarse-grain interleaved shared memory space for the first application and to allocate sufficient fine-grain interleaved shared memory space for the second application. For example, the first application may require 800 megabytes of memory space while the second application may require six gigabytes of memory space. A coarse-grain interleave block size of two gigabytes may be used, resulting in a ceiling mask register value that sets the fine-grain to coarse grain memory interleave boundary to eight gigabytes when memory spaces are rounded up to the nearest gigabyte. Other embodiments may set the ceiling mask register based on the largest memory requirement of a plurality of applications that each will be run on a single node and the memory requirement necessary for a plurality of other applications that will be shared across the plurality of nodes (i.e., sufficient fine-grain interleaved shared memory space should be allocated to contain every shared application running concurrently on the system.

As set forth above, a method and system for providing both coarse-grain and fine-grain interleaved memory space across a distributed shared memory multiprocessor are described. For clarity, only those aspects of the distributed shared memory multiprocessor system germane to the invention are described, and product details well known in the art are omitted. For the same reason, the computer hardware is not described in further detail. It should thus be understood that the invention is not limited to any specific logic implementation, computer language, program, or computer. While various details are set forth in the above description, it will be appreciated that the present invention may be practiced without these specific details. For example, selected aspects are shown in block diagram form, rather than in detail, in order to avoid obscuring the present invention.

Further, while the present invention has been described in the context of specific embodiments and processes, such descriptions are by way of example and not limitation. Other embodiments may combine or omit certain features and/or operations. Accordingly, the proper scope of the present invention is specified by the following claims and not by the preceding examples.

What is claimed is:

1. A method for accessing a distributed shared memory in a multiprocessor system, the method comprising:
   obtaining a first memory requirement for a first application to be run on a single node of a plurality of nodes of the multiprocessor system;
   setting a coarse-grain interleave block size based, at least in part, on the first memory requirement;
   in a distributed shared memory, allocating a first shared memory space with a fine- grain interleave block size and a second shared memory space with the coarse-grain interleave block size, wherein the fine-grain interleave memory block size is equal to a level two cache line size multiplied by a number of level two cache banks;
   receiving a memory access request, the memory access request including a physical memory address;
   comparing the physical memory address to a memory address stored in a ceiling mask register; and
   accessing the first shared memory space in the event that the physical memory address is less than the memory address stored in the ceiling mask register and accessing the second shared memory space in the event that the physical memory address is greater than or equal to the memory address stored in the ceiling mask register,
   obtaining a second memory requirement for a second application to be run on the plurality of nodes; and
   setting the coarse-grain interleave block size based, at least in part, on the second memory requirement;
   wherein the operation of obtaining the first memory requirement comprises setting the first memory requirement to a largest of a plurality of memory requirements associated with applications to be run on the single node; and wherein the operation of obtaining the second memory requirement comprises setting the second memory requirement to a largest of a second plurality of memory requirements associated with applications to be run on the plurality of nodes.

2. The method of claim 1, further comprising:
in the event that the physical memory address is less than the memory address stored in the ceiling mask register, using one or more low order physical memory address bits of the physical memory address to identify a memory agent node of a plurality of nodes of the distributed shared memory multiprocessor system.

3. The method of claim 1, further comprising:
in the event that the physical memory address is greater than or equal to the memory address stored in the ceiling mask register, using one or more high order memory address bits to identify a memory agent node of a plurality of nodes of the distributed shared memory multiprocessor system.

4. The method of claim 1, wherein the ceiling mask register comprises a certain number of most significant memory address bits.

5. A method for programming a ceiling mask register in a distributed shared memory multiprocessor system, the method comprising:
obtaining a first memory requirement for a first application to be run on a single node of a plurality of nodes of the multiprocessor system;
setting a coarse-grain interleave block size based, at least in part, on the first memory requirement;
allocating a first portion of a distributed shared memory as a fine-grain interleaved shared memory space with a first block size equal to a fine-grain interleave block size and a second portion of the distributed shared memory as a coarse-grain interleaved shared memory space with a block size equal to the coarse-grain interleave block size, wherein the fine-grain interleave memory block size is equal to a level two cache line size multiplied by a number of level two cache banks;
establishing a ceiling mask register at a value equal to the coarse-grain interleave block size times a quantity of the plurality of nodes, such that memory addresses less than the ceiling mask access the first portion of the distributed shared memory and memory addresses greater than or equal to the ceiling mask access the second portion of the distributed shared memory;
obtaining a second memory requirement for a second application to be run on the plurality of nodes; and
setting the coarse-grain interleave block size based, at least in part, on the second memory requirement;
wherein the operation of obtaining the first memory requirement comprises setting the first memory requirement to a largest of a plurality of memory requirements associated with applications to be run on the single node; and
wherein the operation of obtaining the second memory requirement comprises setting the second memory requirement to a largest of a second plurality of memory requirements associated with applications to be run on the plurality of nodes.

6. The method of claim 5, wherein the first memory requirement is rounded up to the nearest one gigabyte.

7. A distributed shared memory multiprocessor system, comprising:
a plurality of nodes, each node comprising:
a processor;
a memory configured as a local memory of the node and further configured to have a plurality of physical memory address ranges, each address range comprising a unique physical address range of a distributed shared memory system;
a ceiling mask register; and
wherein the distributed shared memory system comprises:
a first memory space distributed across the plurality of nodes with a fine-grain interleave block size, wherein the fine-grain interleave memory block size is equal to a level two cache line size multiplied by a number of level two cache banks; and
a second memory space distributed across the plurality of nodes with a coarse-grain interleave block size, the course-grain interleave block size based, at least in part, on a first memory requirement for a first application to be run on a single node of the plurality of nodes, wherein the first memory requirement is a largest of a plurality of memory requirements associated with applications to be run on the single node;
wherein the ceiling mask register is configured to indicate a boundary separating the first memory space and the second memory space, such that memory addresses less than the ceiling mask access the first memory space and memory addresses greater than or equal to the ceiling mask access the second memory space; and
wherein the processor is configured to obtain a second memory requirement for a second application to be run on the plurality of nodes and set the coarse-grain interleave block size based, at least in part, on the second memory requirement, wherein the second memory requirement is a largest of a second plurality of memory requirements associated with applications to be run on the plurality of nodes.

8. The distributed shared memory multiprocessor system of claim 7, wherein the processor is a chip multiprocessor comprising:
a plurality of processor cores, each processor core having a level one cache;
a cross bar switch in electrical communication with each one of the plurality of processor cores; and
a shared level two cache configured to receive a memory access request from the crossbar switch.

9. The method of claim 8, wherein the level two cache is further configured to compare the access request address with the boundary.

10. The distributed shared memory multiprocessor system of claim 7, wherein the ceiling mask register is programmed with a distributed shared memory address below which the distributed shared memory is fine-grain interleaved.

11. The distributed shared memory multiprocessor system of claim 7, wherein the fine-grain interleave block size is 512 bytes.

12. The distributed shared memory multiprocessor system of claim 7, wherein the coarse-grain interleave block size is one gigabyte.

13. The distributed shared memory multiprocessor system of claim 7, wherein a size of the first memory space is equal to the coarse-grain interleave block size times a number of nodes in the plurality of nodes.

14. The distributed shared memory multiprocessor system of claim 7, wherein the ceiling mask register comprises a plurality of high order memory address bits.

* * * * *